(12) United States Patent
Engelbrecht et al.

(10) Patent No.: US 8,070,106 B2
(45) Date of Patent: Dec. 6, 2011

(54) AIRCRAFT WING AND FLAP DEPLOYMENT SYSTEM

(75) Inventors: Thomas H Engelbrecht, Bristol (GB); Robert I Thompson, Bristol (GB); Nicholas J White, Bristol (GB)

(73) Assignee: Airbus Operations Limited, Bristol (GB)

( * ) Notice: Subject to any disclaimer, the term of this patent is extended or adjusted under 35 U.S.C. 154(b) by 503 days.

(21) Appl. No.: 12/292,231

(22) Filed: Nov. 14, 2008

(65) Prior Publication Data
US 2009/0134281 A1 May 28, 2009

(30) Foreign Application Priority Data

Nov. 15, 2007 (GB) ................................. 0722415.7

(51) Int. Cl.
*B64C 3/50* (2006.01)
(52) U.S. Cl. ........................................ 244/215; 244/213
(58) Field of Classification Search .................. 244/213, 244/215–217, 46, 201, 99.2, 99.3
See application file for complete search history.

(56) References Cited

U.S. PATENT DOCUMENTS

| | | | |
|---|---|---|---|
| 2,555,862 A | | 6/1951 | Romani |
| 3,203,647 A | * | 8/1965 | Alvarez-Calderon ........ 244/216 |
| 4,172,575 A | | 10/1979 | Cole |
| 4,720,066 A | * | 1/1988 | Renken et al. ................ 244/213 |
| 4,784,355 A | | 11/1988 | Brine |
| 4,892,274 A | | 1/1990 | Pohl et al. |
| 5,680,124 A | * | 10/1997 | Bedell et al. .................. 340/945 |
| 6,382,566 B1 | * | 5/2002 | Ferrel et al. ................... 244/215 |
| 6,464,176 B2 | * | 10/2002 | Uchida et al. ................. 244/216 |
| 2006/0049308 A1 | * | 3/2006 | Good et al. ................ 244/76 A |
| 2007/0034748 A1 | | 2/2007 | Sajurai et al. |

FOREIGN PATENT DOCUMENTS

| | | |
|---|---|---|
| DE | 697 606 | 10/1937 |
| GB | 2 079 688 | 1/1982 |

OTHER PUBLICATIONS

Grumman X-29 Wikipedia Article (http://en.wikipedia.org/wiki/Grumman_X-29) Aug. 11, 2005.*
United Kingdom Search Report for GB Application No. 0722415.7, dated Mar. 12, 2008.

* cited by examiner

*Primary Examiner* — Timothy D Collins
*Assistant Examiner* — Jamie S Stehle
(74) *Attorney, Agent, or Firm* — Nixon & Vanderhye, P.C.

(57) ABSTRACT

An aircraft wing including: a main wing element; and a flap connected to the main wing element by a deployment system which can deploy the flap from a retracted position to an extended position, wherein the wing has a trailing edge which is swept, at least in the region of the flap, when the flap is in its retracted position, and wherein the deployment system is arranged such that the flap reduces the degree of sweep of the trailing edge of the wing in the region of the flap as it is deployed. The deployment system includes a first actuator configured to rotate the flap horizontally so as to change the sweep angle of the flap and a second actuator configured to rotate the flap vertically so as to increase the camber of the wing, and the first and second actuators are operable independently of each other.

20 Claims, 11 Drawing Sheets

AIRCRAFT WING AND FLAP DEPLOYMENT SYSTEM

FIELD OF THE INVENTION

The present invention relates to an aircraft wing comprising: a main wing element; and a flap connected to the main wing element by a deployment system which can deploy the flap from a retracted position to an extended position. The invention also relates to a method and system for deploying the flap.

BACKGROUND OF THE INVENTION

Conventional flap deployment systems include flap track mechanisms, drop link mechanisms, and multi-bar linkage mechanisms. Flap track mechanisms employ a track on which the flap runs on roller bearings as it moves between its retracted and extended positions. Drop link mechanisms employ a rigid drop link which is pivotally coupled at one end to the main wing element and to the flap at the other end.

Most flap deployment systems impart a vertical rotation to the flap so as to increase the camber of the wing. Some also impart a degree of rearward translation to the flap (commonly referred to as "Fowler motion"). US 2007/0034748 A1 discloses a multi-bar linkage mechanism which imparts a degree of horizontal rotation to the flap. This has the effect of increasing the degree of sweep of the wing in the region of the flap.

A degree of sweep in the trailing edge of the wing may be desirable to reduce drag during high speed operations, but may be less than optimal for low speed operations in which a higher lift coefficient is required.

U.S. Pat. No. 4,172,575 discloses a flap deployment system in which inboard and outboard flap linkage mechanisms act together to produce a pseudo conical flap extension. Both linkages are driven from a single rotary actuator.

SUMMARY OF THE INVENTION

A first aspect of the invention provides an aircraft wing comprising: a main wing element; and a flap connected to the main wing element by a deployment system which can deploy the flap from a retracted position to an extended position, wherein the wing has a trailing edge which is swept, at least in the region of the flap, when the flap is in its retracted position, the deployment system is arranged such that the flap reduces the degree of sweep of the trailing edge of the wing in the region of the flap as it is deployed, the deployment system comprises a first actuator configured to rotate the flap horizontally so as to change the sweep angle of the flap and a second actuator configured to rotate the flap vertically so as to increase the camber of the wing, and the first and second actuators are operable independently of each other.

Typically the actuators are electric or hydraulic actuators.

Typically the first actuator is configured to rotate the flap horizontally in response to a first control signal, and the second actuator is configured to rotate the flap vertically in response to a second control signal. The control signals may be for example electrical, hydraulic or pneumatic control signals.

A second aspect of the invention provides a method of deploying a flap from an aircraft wing having a trailing edge which is swept, at least in the region of the flap, when the flap is in a retracted position, the method comprising: deploying the flap from a retracted position to an intermediate position during which deployment the major component of rotation is horizontal such that the flap reduces the degree of sweep of the trailing edge of the wing in the region of the flap as it is deployed; and deploying the flap from the intermediate position to a fully deployed position during which deployment the major component of rotation is vertical.

By decreasing the degree of sweep of the trailing edge of the aircraft, the flap can increase the aerodynamic and/or structural efficiency of the wing and maximize lift.

The trailing edge of the wing may be swept forward, and in this case the flap locally reduces the forward sweep angle of the wing as it is deployed. However in the preferred embodiment of the invention the wing has a trailing edge which is swept to the rear, and the flap reduces the rearward sweep angle of the trailing edge of the wing in the region of the flap as it is deployed.

When in its extended position, the trailing edge of the flap may be:

1. swept in an opposite sense to the trailing edge of the wing when the flap is in its retracted position;
2. swept in the same sense as the trailing edge of the wing when the flap is in its retracted position, but with a lower angle of sweep; or
3. not swept—that is with a sweep angle of approximately zero.

Preferably the trailing edge has a sweep angle as close as possible to zero when in its extended position.

The deployment system is configured to impart a degree of horizontal rotation to the flap as it is deployed. This enables the flap to be stowed more compactly within the wing when it is in its retracted position. In the case where the wing is swept to the rear, then the deployment system is configured to rotate the flap horizontally such that an inboard edge of the flap moves along a longer path than an outboard edge of the flap when viewed in plan. Note that this horizontal rotation may be a pure rotation about a fixed vertical axis, or more typically a horizontal rotation combined with a translation and/or a rotation about a horizontal axis.

The deployment system may comprise a single drive assembly which is connected to a single point on the flap. However more preferably the deployment system comprises: an inboard flap track assembly comprising a carriage connected to a first part of the flap, and a track for guiding the carriage along a first path; an outboard flap track assembly comprising a carriage connected to a second part of the flap which is outboard of the first part of the flap, and a track for guiding the carriage along a second path. In order to obtain horizontal rotation, the first and second paths can be made of different lengths. Each flap track assembly may drive the carriage by means of active driven rollers, or by a drive mechanism which is configured to push the carriage along the track.

The deployment system is further configured to impart a degree of vertical rotation to the flap as it is deployed so as to increase the camber of the wing. This vertical rotation may be achieved by a dropped hinge mechanism, by a "Fowler flap" track mechanism, or by an other suitable means. The vertical rotation may be generated at the same time as the horizontal rotation, or during a different phase of motion of the flap.

The flap may be positioned at any point on the wing, but most preferably the flap is a most inboard flap of the wing. In this case the landing gear is preferably at least partially mounted to the fuselage, giving sufficient room to house the flap and associated deployment system.

A third aspect of the invention provides a deployment system for deploying an aircraft wing flap, the system comprising a first actuator configured to rotate the flap horizontally so as to change a sweep angle of the flap; and a second actuator configured to rotate the flap vertically so as to increase the camber of the wing, wherein the first and second actuators are operable independently of each other.

Various preferred features of the wing and deployment system are set out below in the dependent claims.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
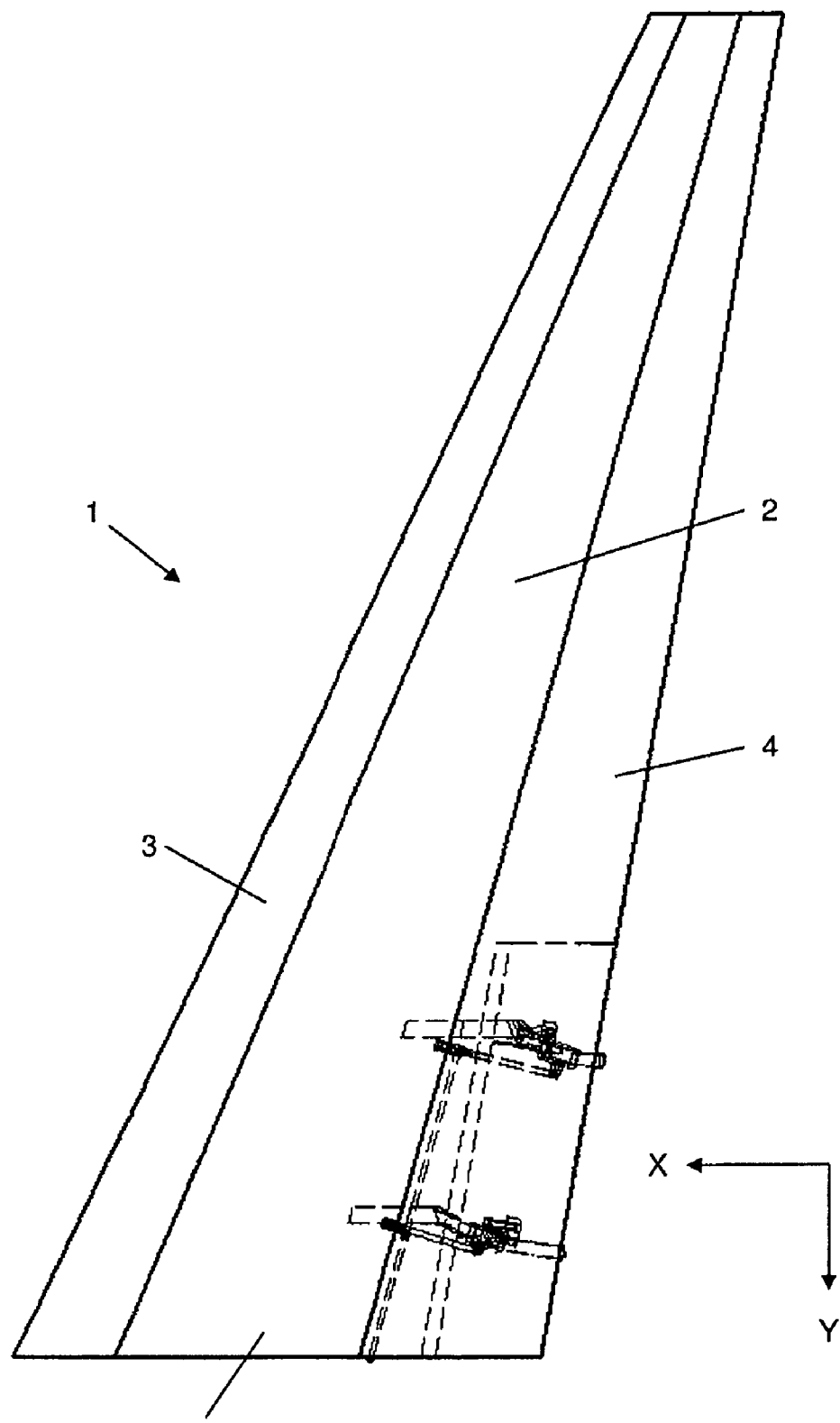
FIGS. 1 to 3 are plan views of an aircraft wing with the flap in its retracted, intermediate and fully deployed positions respectively.
Figure 2:
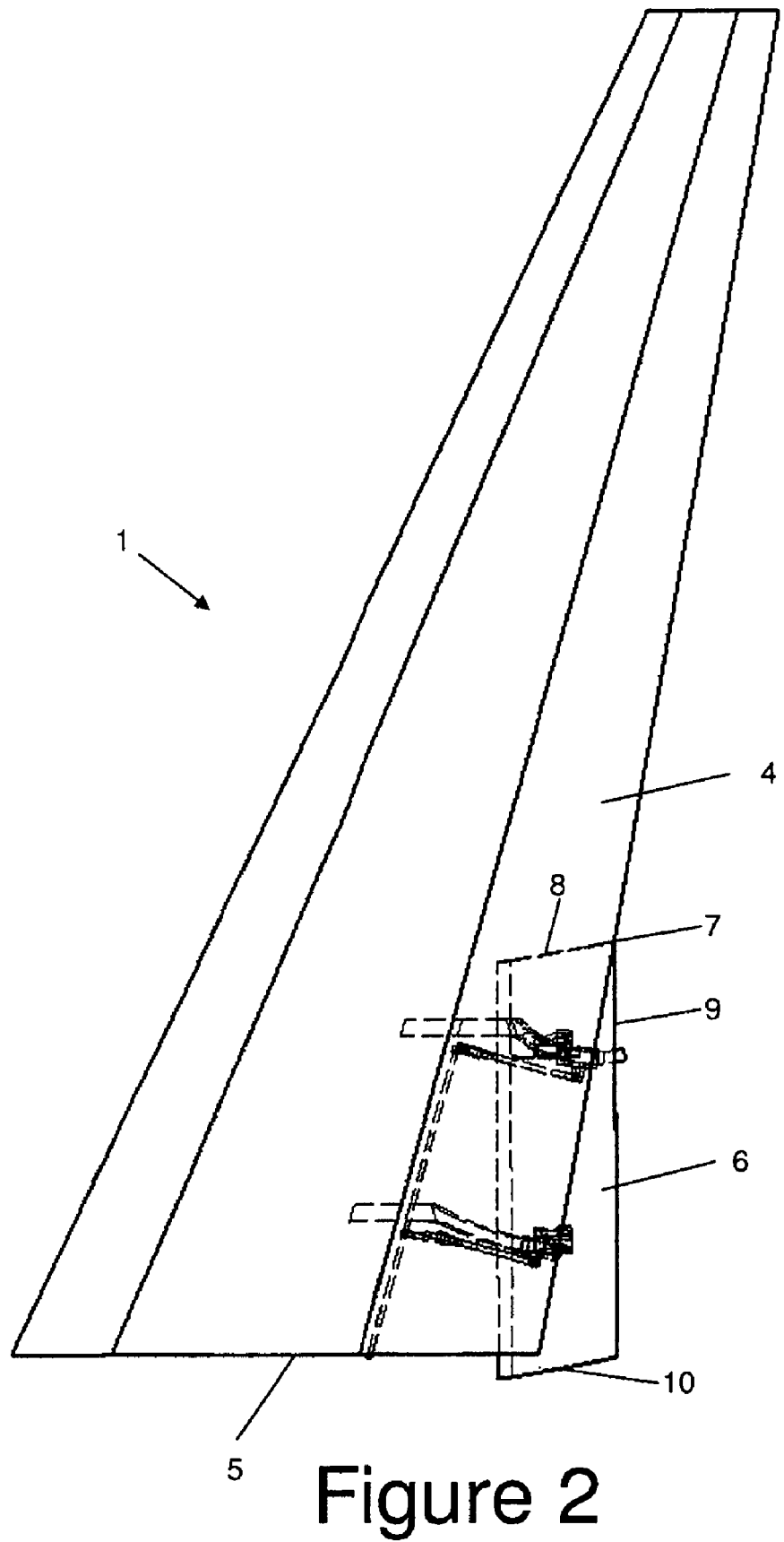
Figure 3:
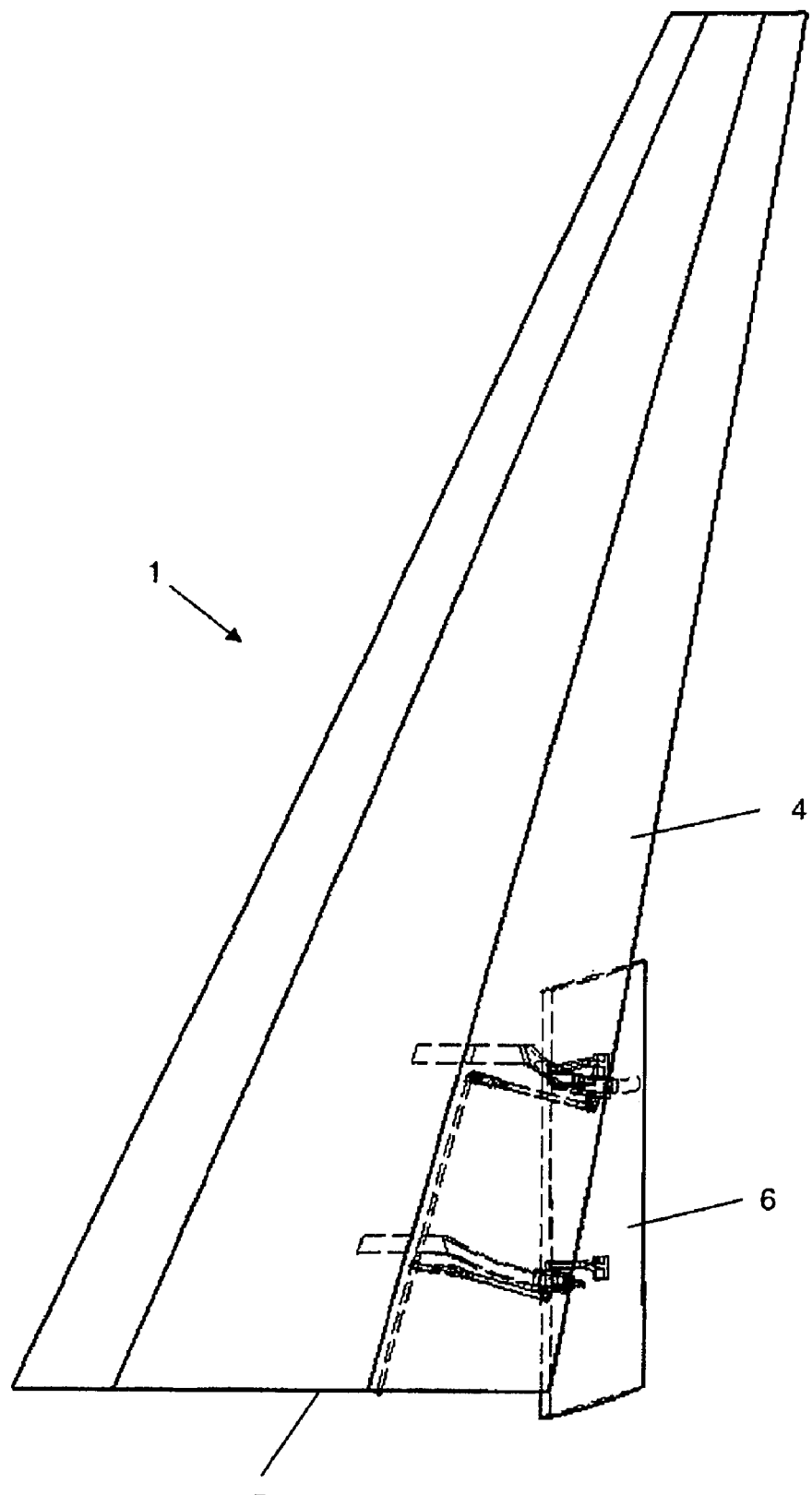

An aircraft wing 1 shown in FIGS. 1-3 comprises a wing box 2; a leading edge upper panel 3; and a trailing edge upper panel 4. The wing box has an inboard end 5 (conventionally known as a wing root) connected to a fuselage (not shown).

The wing box 2 carries a number of high lift devices including slats on its leading edge and flaps on its trailing edge. The most inboard flap 6 of the wing, known as a Yehudi flap, is illustrated in FIGS. 1-3 in its retracted, intermediate and fully deployed positions respectively.

The movement of the flap 6 includes a component of horizontal rotation about a vertical axis passing through the point 7 (labelled in FIG. 2) where the outboard edge 8 of the flap 6 meets its leading edge 9. Thus as the flap is deployed, its inboard edge 10 moves along a longer path than its outboard edge 8 when viewed in plan, as can be seen by a comparison of FIGS. 2 and 3 with FIG. 1.

Figure 4:
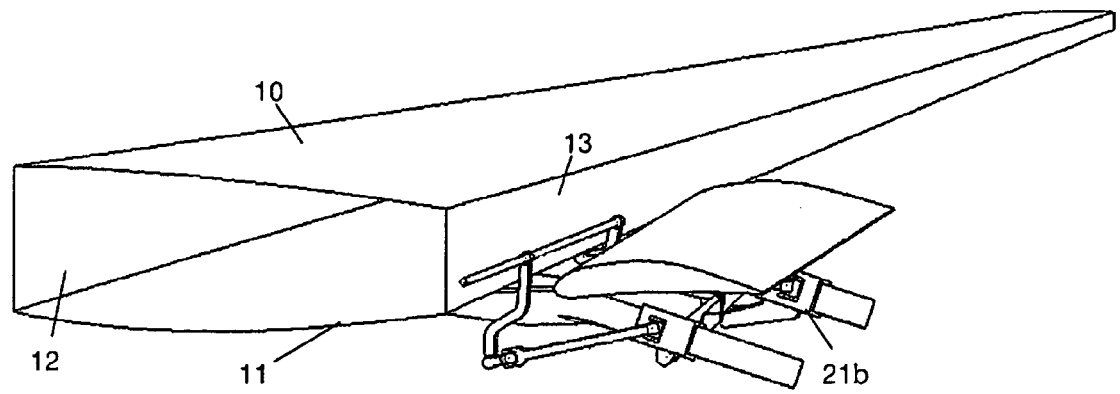
FIGS. 4 to 6 are perspective views from a first viewing angle, showing the flap in its retracted, intermediate and fully deployed positions respectively.

As shown in FIG. 4, the wing box 2 comprises upper and lower skins 10,11 joined to a front spar 12 and a rear spar 13, and ribs (not shown) running between the front and rear spars. The flap 6 is connected to the wing-box by an inboard flap track assembly 14a and an outboard flap track assembly 14b shown in FIG. 7. These assemblies are covered by a flap track fairing (not shown).

Figure 7:
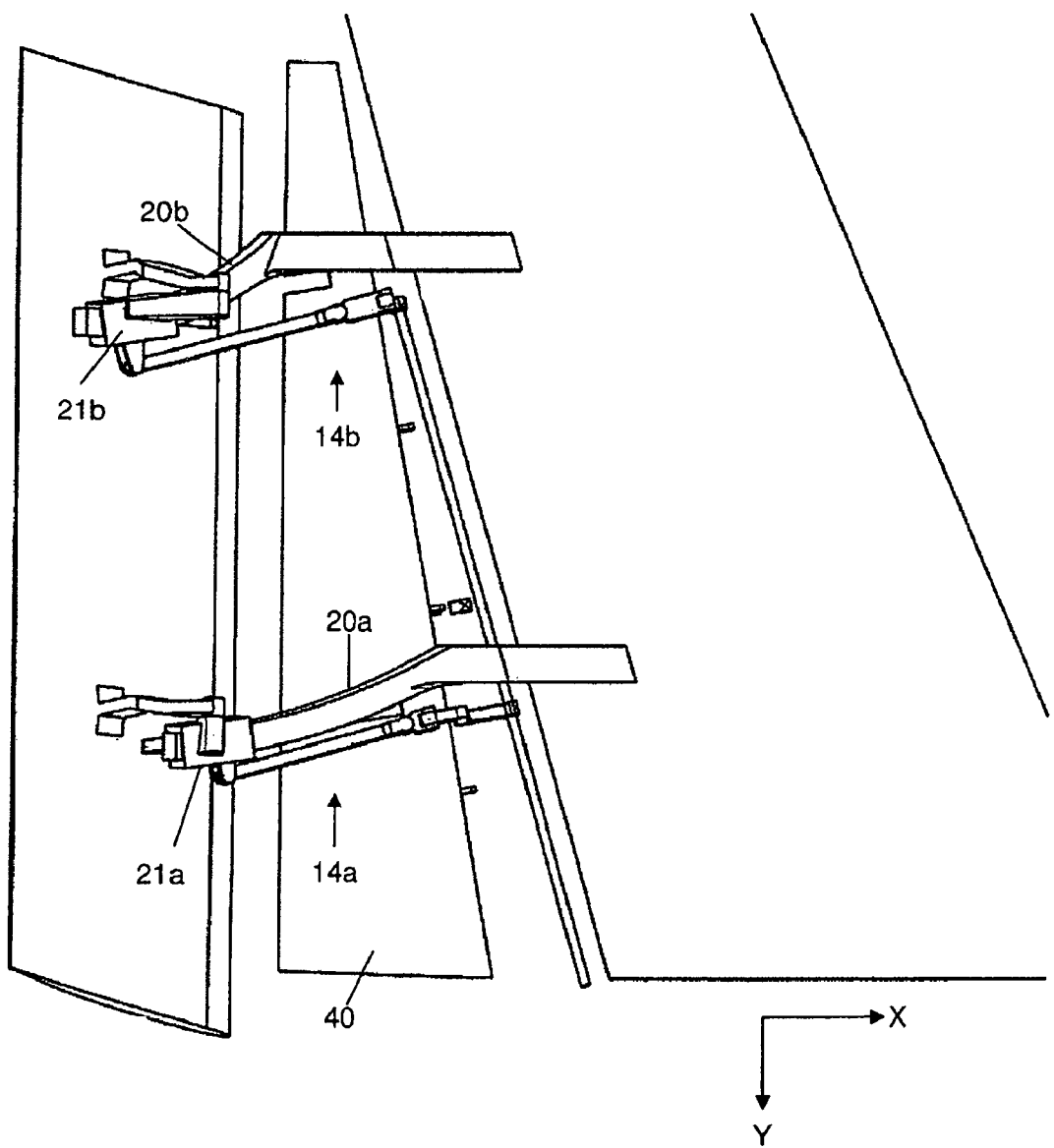
FIG. 7 is an underside view of the flap in its fully deployed position.

Referring to FIG. 7, the flap track assemblies comprise track arms 20a,20b each attached to a respective rib (not shown) of the wing box 2. Each track arm carries a set of roller bearings (not shown) which guides a carriage 21a,21b along the arm.

Figure 6:
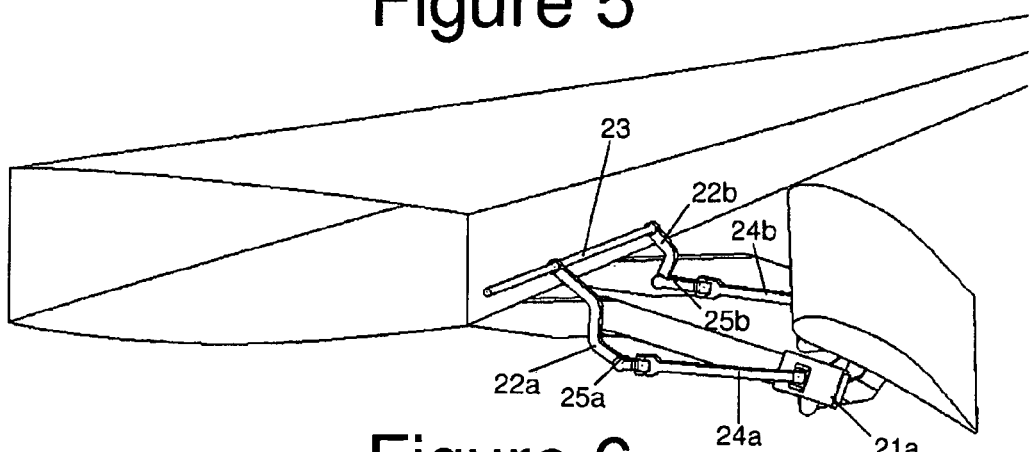

Each carriage is pushed along the flap track arm by a respective drive mechanism. As shown in FIG. 6, each drive mechanism comprises a drive arm 22a,22b rigidly attached to a drive axle 23 which runs spanwise along the wing parallel to the rear spar 13. A push rod 24a,24b is coupled to each drive arm by a respective U-joint 25a,25b. As shown most clearly in FIG. 9, the U-joint 25a comprises an arm which is pivotally attached at one end to a pair of arms 26a,27a at a proximal end of the push rod 24a. This enables the push rod 24a to rotate relative to the U-joint about an approximately vertical pivot axis 28a between the arms 26a, 27a. The other end of the U-joint arm is pivotally attached to a distal end of the drive arm 22a by a pair of arms extending from the U-joint arm (one of such arms being visible in FIG. 9 and indicated with reference numeral 29a). This enables the drive arm 22a to rotate relative to the U-joint about an approximately horizontal pivot axis 30a between the U-joint arms. The drive arm 22b, U-joint 25b and push rod 24b in the outboard actuator are coupled together in a similar manner.

Figure 5:
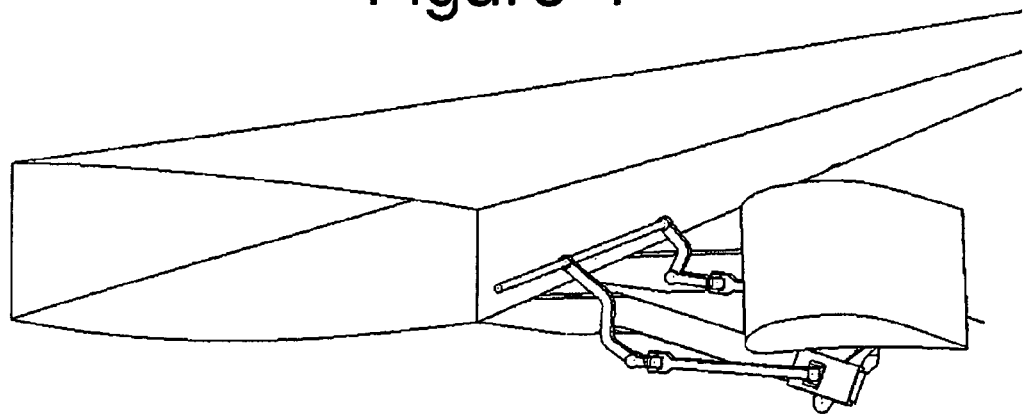
Figure 8:
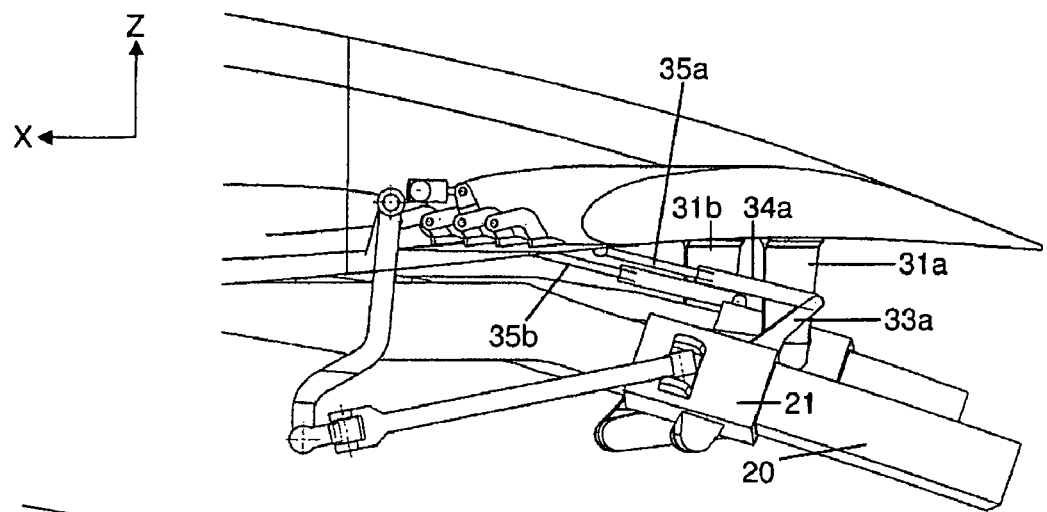
FIGS. 8 to 10 are perspective views taken from a second viewing angle, showing the flap in its retracted, intermediate and fully deployed positions respectively.
Figure 9:
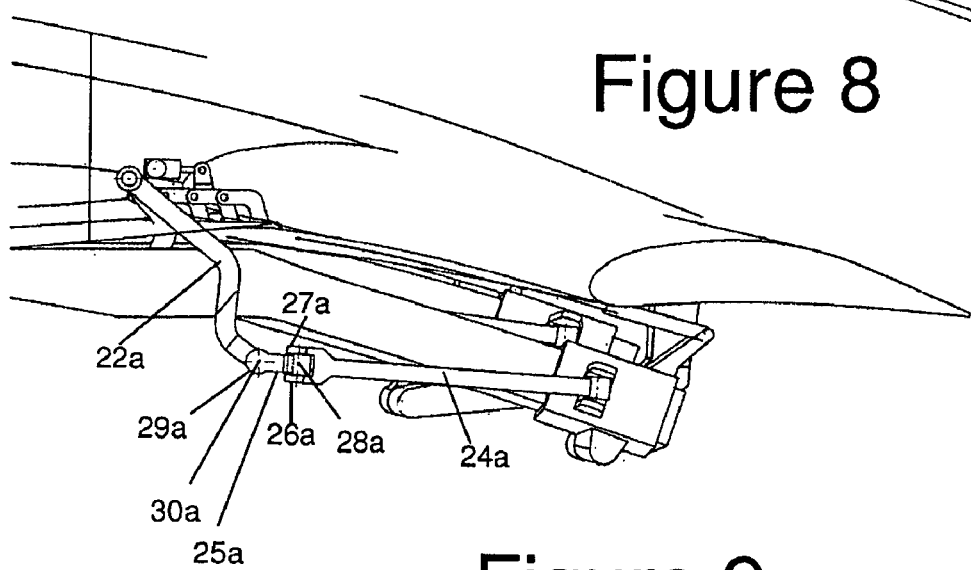

Thus as the drive axle 23 is rotated, the drive mechanisms move at the same time between their contracted configurations shown in FIGS. 4 and 8 to their expanded configurations shown in FIGS. 5 and 9 in order to push the carriages along their respective tracks.

As can be seen most clearly in FIG. 6, the length of the drive arm 22a of the inboard drive mechanism is greater than that of the equivalent arm 22b of the outboard drive mechanism. As a result the range of movement of the inboard carriage 21a is greater than that of the outboard carriage 21b.

Figure 11:
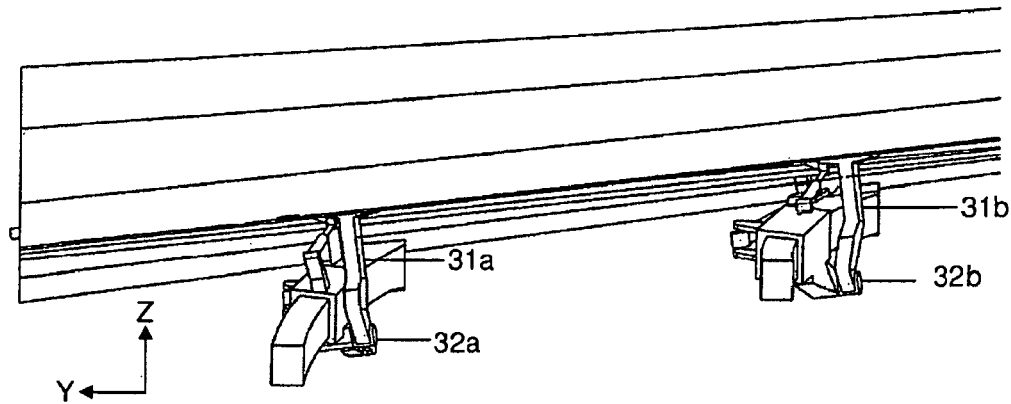
FIGS. 11 to 13 are perspective views taken from a third viewing angle, showing the flap in its retracted, intermediate and fully deployed positions respectively.

As shown in FIG. 11 each carriage is connected to the flap by a dropped-hinge mechanism comprising a drop-link 31a, 31b which has a distal end attached to the flap and a proximal end pivotally coupled to the carriage by a pivot pin 32a,32b.

Figure 10:
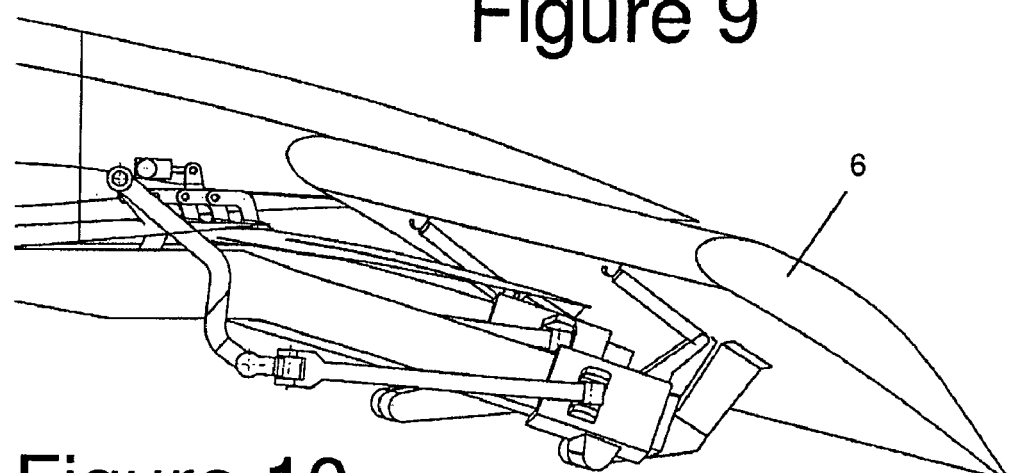
Figure 12:
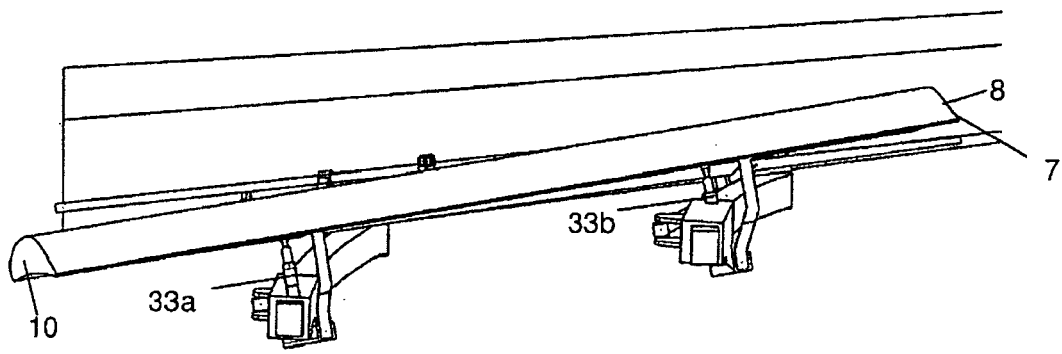
Figure 13:
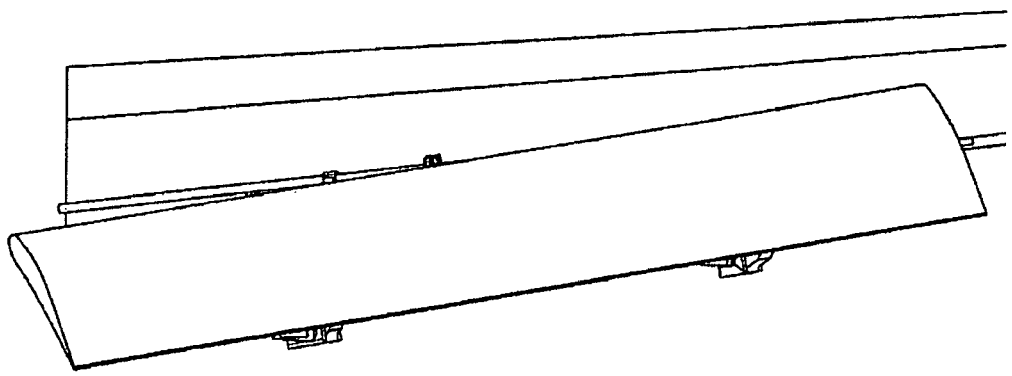

As shown in FIG. 12, each carriage carries a rigid arm 33a,33b. The flap is rotated about the pivot pins 32a,32b by a pair of hydraulic linear actuators. As shown in FIG. 8, each hydraulic actuator comprises an actuator body 34a which is pivotally attached to a respective one of the arms 33a, and an actuator rod 35a which is pivotally attached to the flap. Thus as the actuators rods 35a,35b are extended, the drop-links rotate the flap from the intermediate position of FIG. 9 to the fully deployed position of FIG. 10.

Figure 14:
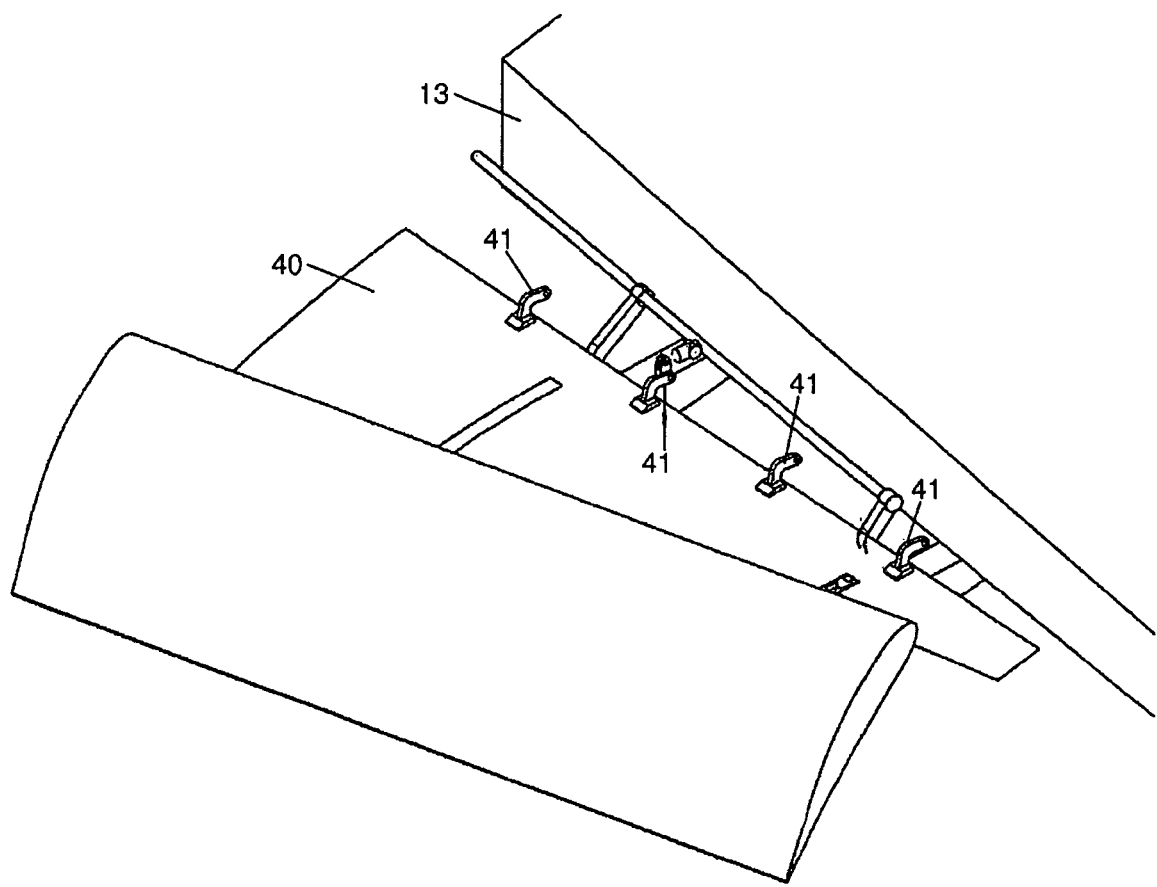
FIG. 14 is an isometric view of the flap in its fully deployed position from a fourth viewing angle.
Figure 15:
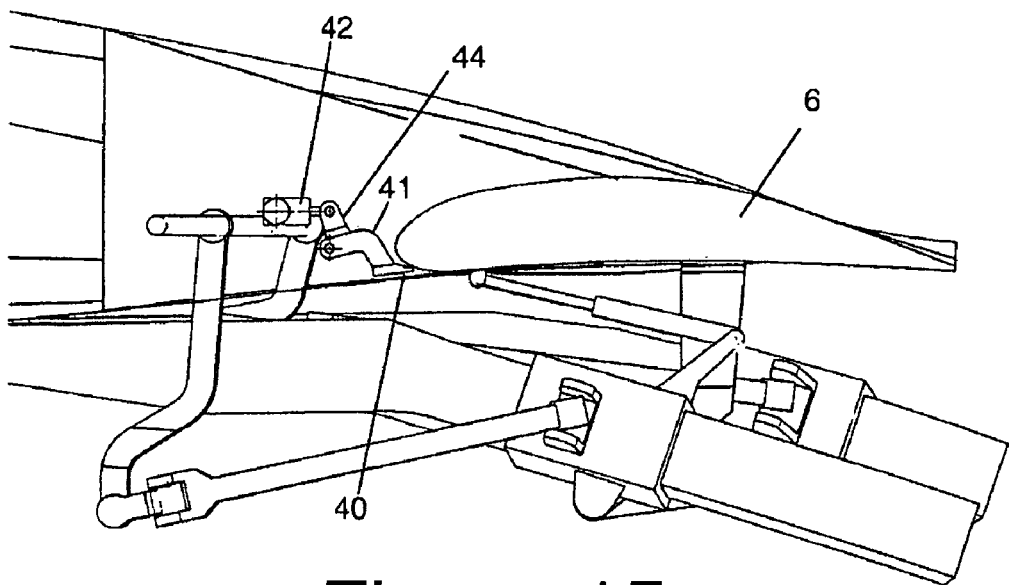
FIGS. 15 to 17 are perspective views taken from a fifth viewing angle, showing the flap in its retracted, intermediate and fully deployed positions respectively.
Figure 16:
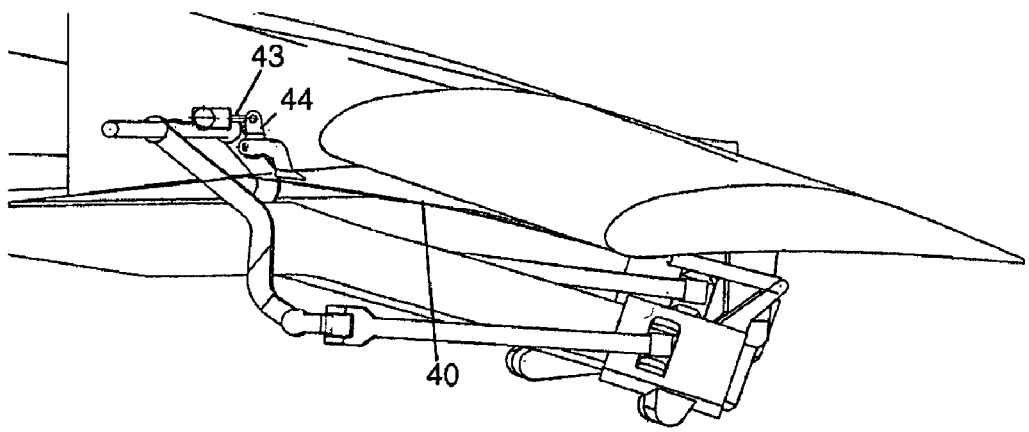
Figure 17:
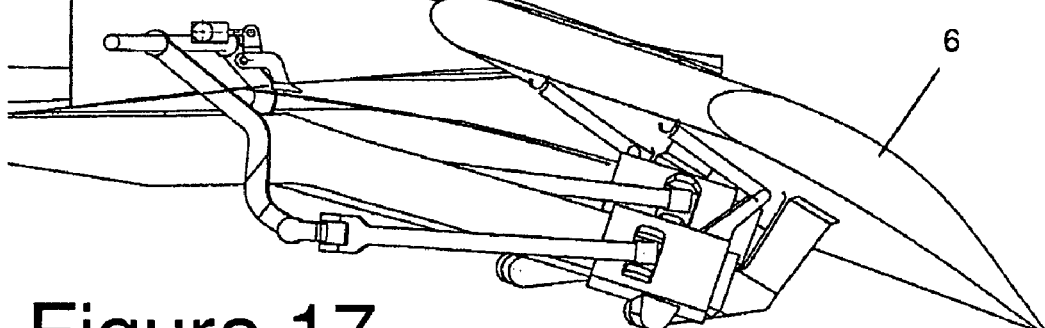
Figure 18:
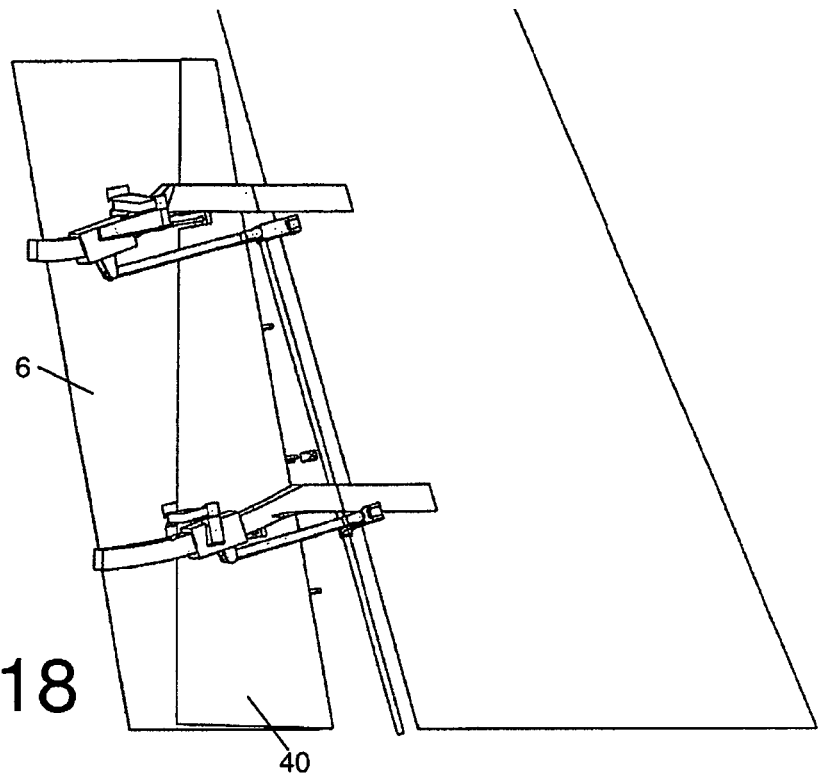
FIGS. 18 and 19 are underside views showing the flap in its retracted and intermediate positions respectively.
Figure 19:
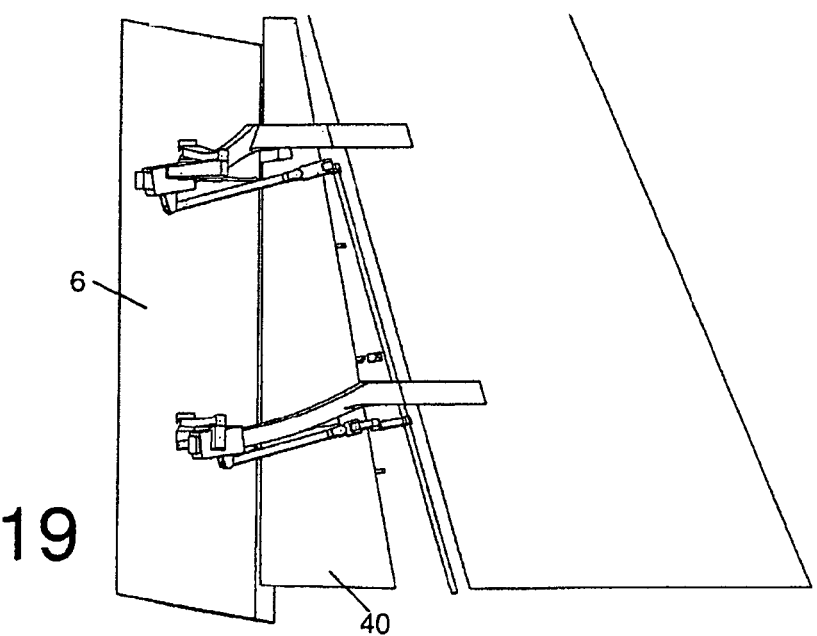

A panel 40 shown in FIGS. 14-19 (but not shown in FIGS. 1-6) seals against the lower face of the flap 6 as shown in FIG. 15. The panel 40 can be moved downwards to enable the flap to be moved from its retracted position to its intermediate position. The panel 40 has four brackets 41 arranged along its rear edge as shown in FIG. 14. An axle (not shown) is mounted to the spar 13 and passes through the brackets 41. The panel 40 is driven downwards between its raised position (FIG. 15) and its lowered position (FIG. 16) by a hydraulic actuator comprising a body 42 and a push rod 43. The body 42 is rigidly attached to the wing box 2, and the push rod is pivotally attached to an arm 44 which extends from one of the brackets 41.

In its retracted position the flap 6 is stored within the trailing edge cove, utilising the area between rear spar and trailing edge if no landing gear is present and minimising the wetted area and profile drag of the wing. This retracted position is therefore used during cruise of the aircraft. The single trapezoid planform of the wing in cruise (FIG. 1) provides low drag for high speed operation.

Interim deployed positions can be used to support load alleviation and improve wing structure margin utilisation, by alteration of chord and wing area distribution to adapt to changes in aircraft weight.

In the intermediate and fully deployed positions (FIGS. 2 and 3 respectively) the horizontal rotation of the flap provides a kinked wing planform: that is with a straight leading edge and a trailing edge kinked to the rear at is inboard end. In these positions, the trailing edge of the wing has an outboard portion which is swept to the rear, and an inboard portion (that is, the flap 6) which is swept slightly forward.

Note that the sweep angles shown in FIGS. 1-3 are examples only, and the sweep angle of the flap 6 could be more or less than the angle shown. For instance in the position of FIG. 2 and/or FIG. 3 the trailing edge of the flap 6 may have a sweep angle of zero, or may be slightly swept to the rear (but at a lower angle of sweep than the outboard part of the trailing edge of the wing). Also, the leading edge of the wing may be kinked forward at is inboard end. It is believed that the horizontal rotation of the flap 6 may be particularly advantageous in combination with such a kinked leading edge.

Thus in general the trailing edge of the wing is swept to the rear, at least in the region of the flap, when the flap is in its retracted position as shown in FIG. 1. The flap reduces the degree of sweep of the trailing edge of the wing in the region of the flap as it is deployed to the intermediate position shown in FIG. 2, as well as increasing the wing area.

In the intermediate position, the flap 6 maximises the inboard planform area of the wing without increasing camber. This is particularly useful at take off and other high wing load cases.

The vertical rotation of the flap 6 as it moves to its fully deployed position increases the wing camber and maximises lift. This is particularly useful at landing to minimise the approach speed of the aircraft.

The design of the flap provides the following advantages:
the flap reduces the degree of sweep of the trailing edge of the wing when it is deployed. The leading edge of the flap (as well as its trailing edge which is approximately parallel with the leading edge) has a low (or zero) angle of sweep which provides maximal lift
the outboard flap track assembly 14*b* can be smaller than the inboard flap track assembly 14*a*. This minimises the weight of the assembly 14*b* (and thus its moment about the X-axis) as well as minimising the space occupied by it
the flap can be stowed compactly within the trailing edge as shown in FIG. 1, with the flap leading edge approximately parallel to the rear spar
the ratio between the inboard and outboard wing area can be controlled easily, enabling the inboard area to be increased if necessary to carry high loads
low speed stall becomes less likely as the wing will naturally stall more outboard when the flap is deployed (compared to a single trapezoid wind).

Figure 20:
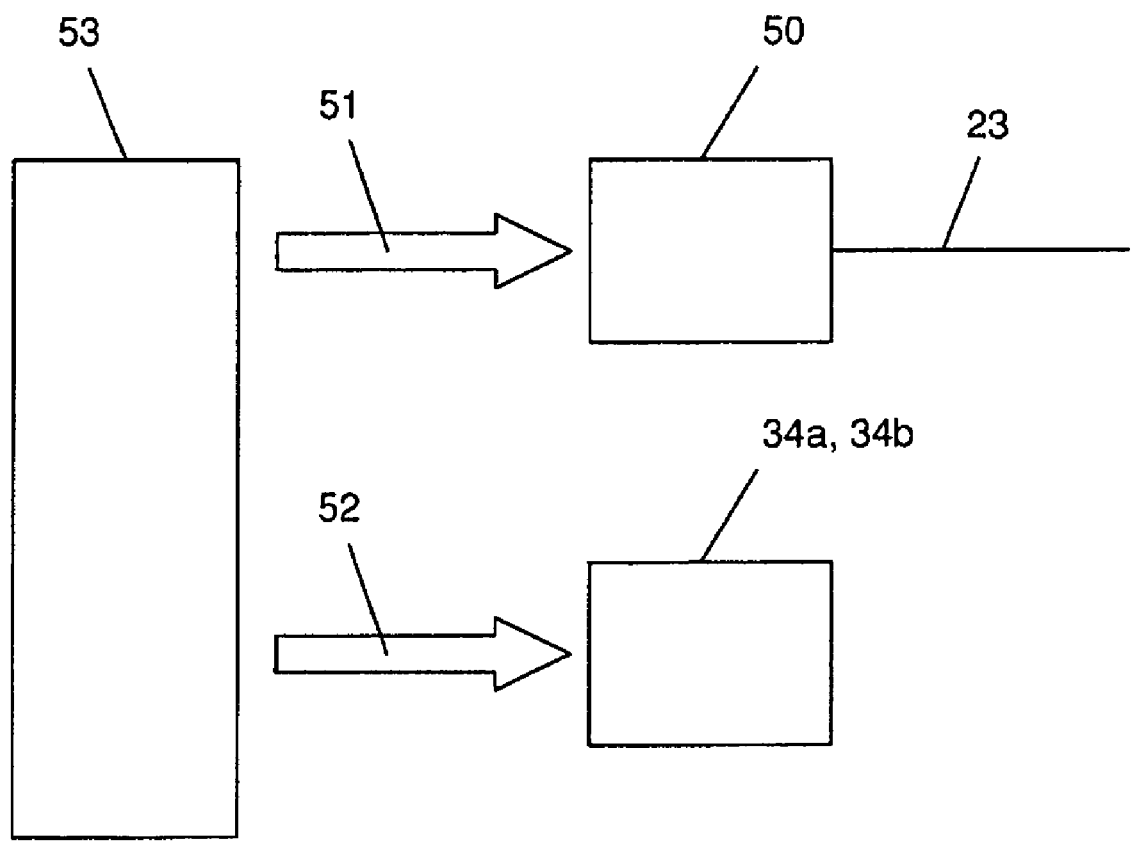
FIG. 20 is a schematic view of the electrical control system for controlling the actuators.

Note that the drive axle 23 and the hydraulic actuators 34*a*,34*b* are operable independently of each other. As shown schematically in FIG. 20, the drive axle 23 is driven by an electric motor 50 which receives a first control signal 51 as its drive input, and the hydraulic actuators 34*a*, 34*b* receive a second control signal 52 as their drive input. Therefore during takeoff a master controller 53 issues a control signal 51 so that only the drive axle 23 is operated to deploy the flap from its retracted position to its intermediate position. During this deployment the major component of rotation is horizontal. During approach the drive axle 23 is first operated by the first control signal 51 to deploy the flap to its intermediate position, then the hydraulic actuators 34*a*,34*b* are operated by the second control signal 52 to rotate the flap down to its fully deployed position. During this second phase of motion the major component of rotation of the flap is vertical.

Note that although the other flaps of the wing are not shown, these are deployed by conventional mechanisms (such as drop-link mechanisms) which do not horizontally rotate the flap.

The arrangement described above is particularly useful in an aircraft in which the landing gear is at least partially mounted to the fuselage, thus maximising the available space within the so-called "Yehudi" area of the wing around the flap 6.

Lap and gap control with the upper surface of the flap can be provided by spoilers or flexible panels, if available. Sealing of the outboard and inboard edges 8, 10 of the flap 6 can be achieved using telescopic, rubber or brush attachments (not shown).

In the embodiment described above, the flap track assemblies comprise a track defined by a set of rollers, and a carriage which is carried by these rollers. However various alternative flap track mechanisms can be envisaged, including one in which the carriage carries the rollers instead of the flap track arm. Also, the carriages are driven along their respective tracks by multi-arm link mechanisms, but other drive mechanisms can be envisaged including a linear hydraulic push actuator, or an electric drive motor which rotates the rollers.

Also, instead of using a pair of flap track assemblies, other arrangements can be envisaged in order to generate horizontal rotation of the flap 6, including:
replacing the outboard flap track assembly 14*b* with a ball joint which couples the outboard edge of the flap to the wing box and enables it to rotate about a vertical axis; or
one or both of the flap track assemblies may be replaced by a multi-bar linkage mechanism such as the one described in US2007/0034748 A1

Although the invention has been described above with reference to one or more preferred embodiments, it will be appreciated that various changes or modifications may be made without departing from the scope of the invention as defined in the appended claims.

The invention claimed is:

1. An aircraft wing comprising: a main wing element; and a flap connected to the main wing element by a deployment system which can deploy the flap from a retracted position to an extended position, wherein the wing has a trailing edge which is swept, at least in the region of the flap, when the flap is in its retracted position, the deployment system is arranged such that the flap reduces the degree of sweep of the trailing edge of the wing in the region of the flap as it is deployed, the deployment system comprises a first actuator configured to rotate the flap horizontally so as to change the sweep angle of the flap and a second actuator configured to rotate the flap vertically so as to increase the camber of the wing, and the first and second actuators are operable independently of each other and said actuators are configured so that operation of only the first actuator provides a major component of rotation of the flap is in said horizontal direction and operation of only the second actuator provides a major component of rotation of the flap is in said vertical direction.

2. The wing of claim 1 wherein the wing has a trailing edge which is swept to the rear, at least in the region of the flap, when the flap is in its retracted position, and wherein the deployment system is arranged such that the flap reduces the rearward sweep angle of the trailing edge of the wing in the region of the flap as it is deployed.

3. The wing of claim 1 wherein the deployment system is configured to rotate the flap horizontally such that an inboard edge of the flap moves along a longer path than an outboard edge of the flap when viewed in plan.

4. The wing of claim 1, wherein the deployment system comprises:
an inboard flap track assembly comprising a carriage connected to a first part of the flap, and a track for guiding the carriage along a first path; and an outboard flap track assembly comprising a carriage connected to a second part of the flap which is outboard of the first part of the flap, and a track for guiding the carriage along a second path.

5. The wing of claim 4 wherein each flap track assembly further comprises a drive mechanism which is configured to push the carriage along the track.

6. The wing of claim 4 wherein each carriage is connected to the flap by a drop-link which has a distal end attached to the flap and a proximal end pivotally coupled to the carriage, whereby when the drop-link is rotated about its pivot the flap rotates about the pivot.

7. The wing of claim 5 wherein the drive mechanisms are driven by the first actuator.

8. The wing of claim 6 wherein the drop links are rotated by the second actuator.

9. The wing of claim 1 further comprising a panel which is positioned below the flap and can be moved downwards to enable the flap to be deployed.

10. The wing of claim 1 wherein a leading edge of the wing is kinked forward at its inboard end.

11. The wing of claim 1 wherein the first actuator is configured to rotate the flap horizontally in response to a first control signal, and the second actuator is configured to rotate the flap vertically in response to a second control signal.

12. A method of deploying a flap from an aircraft wing having a trailing edge which is swept, at least in the region of the flap, when the flap is in a retracted position, the method comprising: deploying the flap from a retracted position to an intermediate position during which deployment the major component of rotation is horizontal such that the flap reduces the degree of sweep of the trailing edge of the wing in the region of the flap as it is deployed; and deploying the flap from the intermediate position to a fully deployed position during which deployment the major component of rotation is vertical.

13. The method of claim 12 wherein the wing has a trailing edge which is swept to the rear, at least in the region of the flap, when the flap is in its retracted position, and wherein the flap reduces the degree of rearward sweep of the trailing edge of the wing in the region of the flap as it is deployed.

14. The method of claim 12 wherein the flap is deployed from the retracted position to the intermediate position by operating a first actuator, and wherein the flap is deployed from the intermediate position to a fully deployed position by operating a second actuator independently of the first actuator.

15. The system of claim 14 further comprising issuing a first control signal to the first actuator to operate the first actuator; and issuing a second control signal to the second actuator to operate the second actuator.

16. A deployment system for deploying an aircraft wing flap, the system comprising a first actuator configured to rotate the flap horizontally so as to change a sweep angle of the flap; and a second actuator configured to rotate the flap vertically so as to increase the camber of the wing, wherein the first and second actuators are operable independently of each other and said actuators are configured so that operation of only the first actuator provides a major component of rotation of the flap is in said horizontal direction and operation of only the second actuator provides a major component of rotation of the flap is in said vertical direction.

17. The system of claim 16 wherein the first actuator is configured to rotate the flap horizontally in response to a first control signal, and the second actuator is configured to rotate the flap vertically in response to a second control signal.

18. The system of claim 16 comprising:
an inboard flap track assembly comprising a carriage connectable to a first part of the flap, and a track for guiding the carriage along a first path; and
an outboard flap track assembly comprising a carriage connectable to a second part of the flap which is outboard of the first part of the flap, and a track for guiding the carriage along a second path.

19. The system of claim 18 wherein each carriage is connectable to the flap by a drop-link which has a distal end attached to the flap and a proximal end pivotally coupled to the carriage, whereby when the drop-link is rotated about its pivot the flap rotates about the pivot.

20. An aircraft wing comprising:
a main wing element;
a flap for said main wing element; and
a deployment system connecting said flap to said main wing element, said deployment system configured to deploy the flap from a retracted position to an extended position, wherein said wing including said flap has a trailing edge which is swept, at least in the region of the flap, and when the flap is in its retracted position, the deployment system is configured such that the flap reduces the degree of sweep of the trailing edge of the wing in the region of the flap as the flap is deployed to the extended position, the deployment system comprises:
a first actuator configured to rotate the flap horizontally so as to change the sweep angle of the flap;
a second actuator configured to rotate the flap vertically so as to increase the camber of the wing, and the first and second actuators are operable independently of each other;
an inboard flap track assembly comprising:
a carriage connected to a first part of the flap,
a track for guiding the carriage along a first path, and
a first drive mechanism which is driven by the first actuator and configured to push the carriage along the track; and
an outboard flap track assembly comprising:
a carriage connected to a second part of the flap which is outboard of the first part of the flap,
a track for guiding the carriage along a second path, and
a second a drive mechanism which is driven by the first actuator and configured to push the carriage along the track, wherein each carriage is connected to the flap by a drop-link which is rotated by the second actuator and has a distal end attached to the flap and a proximal end pivotally coupled to the carriage, whereby when the drop-link is rotated about its pivot the flap rotates about the pivot.

* * * * *